(12) United States Patent
Fujita et al.

(10) Patent No.: US 11,688,555 B2
(45) Date of Patent: *Jun. 27, 2023

(54) CHIP ELECTRONIC COMPONENT

(71) Applicant: Murata Manufacturing Co., Ltd., Nagaokakyo (JP)

(72) Inventors: Yukihiro Fujita, Nagaokakyo (JP); Shogo Kanbe, Nagaokakyo (JP); Kosuke Nakano, Nagaokakyo (JP); Hideki Otsuka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 213 days.

This patent is subject to a terminal disclaimer.

(21) Appl. No.: 17/137,498

(22) Filed: Dec. 30, 2020

(65) Prior Publication Data
US 2021/0118614 A1 Apr. 22, 2021

Related U.S. Application Data

(63) Continuation of application No. 16/427,551, filed on May 31, 2019, now Pat. No. 10,971,301, which is a
(Continued)

(30) Foreign Application Priority Data

Dec. 1, 2016 (JP) .................................. 2016-233717

(51) Int. Cl.
*H01G 2/06* (2006.01)
*H01G 4/232* (2006.01)
(Continued)

(52) U.S. Cl.
CPC .............. *H01G 2/065* (2013.01); *H01G 4/232* (2013.01); *H01G 4/30* (2013.01); *H01G 4/12* (2013.01); *H01G 4/252* (2013.01)

(58) Field of Classification Search
CPC .......... H01G 4/228; H01G 4/232; H01G 4/12; H01G 4/30
See application file for complete search history.

(56) References Cited

U.S. PATENT DOCUMENTS

2011/0120769 A1* 5/2011 Sakatani .............. H05K 3/3442
228/199
2013/0155573 A1* 6/2013 Kim ......................... H01G 4/30
427/79
(Continued)

FOREIGN PATENT DOCUMENTS

JP 2008518428 A * 5/2006
JP 2007188943 A * 7/2007
(Continued)

OTHER PUBLICATIONS

Fujita et al., "Chip Electronic Component", U.S. Appl. No. 16/427,551, filed May 31, 2019.

*Primary Examiner* — Eric W Thomas
(74) *Attorney, Agent, or Firm* — Keating & Bennett, LLP

(57) ABSTRACT

A chip electronic component includes spacers that each have a predetermined thickness direction dimension on a mounting surface in a direction perpendicular to the mounting surface. The spacers each contain, as a main component, an intermetallic compound containing at least one high-melting-point metal selected from Cu and Ni, and Sn defining a low-melting-point metal.

14 Claims, 6 Drawing Sheets

Related U.S. Application Data continuation of application No. PCT/JP2017/043063, filed on Nov. 30, 2017.

(51) Int. Cl.
  *H01G 4/30* (2006.01)
  *H01G 4/12* (2006.01)
  *H01G 4/252* (2006.01)

(56) References Cited

U.S. PATENT DOCUMENTS

| | | | |
|---|---|---|---|
| 2013/0208398 A1* | 8/2013 | Tanaka | H01G 4/12 361/301.4 |
| 2013/0343023 A1 | 12/2013 | Nakagoshi et al. | |
| 2016/0093441 A1* | 3/2016 | Ahn | H01G 2/065 361/301.4 |
| 2017/0042029 A1* | 2/2017 | Nishimura | H01G 2/06 |
| 2017/0330689 A1* | 11/2017 | Hatanaka | H01G 2/06 |

FOREIGN PATENT DOCUMENTS

| | | | | |
|---|---|---|---|---|
| JP | 2013065728 A | * | 4/2013 | |
| JP | 2013128090 A | * | 6/2013 | ............ H01G 13/00 |
| JP | 2015216337 A | * | 12/2015 | |
| KR | 10-2014-0000151 A | | 1/2014 | |

* cited by examiner

CHIP ELECTRONIC COMPONENT

CROSS REFERENCE TO RELATED APPLICATIONS

This application claims the benefit of priority to Japanese Patent Application No. 2016-233717 filed on Dec. 1, 2016 and is a Continuation Application of PCT Application No. PCT/JP2017/043063 filed on Nov. 30, 2017. The entire contents of each application are hereby incorporated herein by reference.

BACKGROUND OF THE INVENTION

1. Field of the Invention

The present invention relates to a chip electronic component and, more particularly, to a terminal portion of a chip electronic component.

2. Description of the Related Art

The application of a voltage across outer electrodes in a multilayer ceramic capacitor, which is an example chip electronic component, causes dielectric polarization between adjacent inner electrodes that oppose each other. The electrostatic capacitance formed by the dielectric polarization may be obtained through outer electrodes.

The dielectric that contributes to formation of the electrostatic capacitance due to the opposing inner electrodes as described above causes electric-field-induced strain depending on the applied voltage. When a multilayer ceramic capacitor is mounted on the surface of a mounting board, the electric-field-induced strain causes the multilayer ceramic capacitor to deform the mounting board, which generates a sound called "acoustic noise" depending on the frequency of the deformation. A larger "acoustic noise" leads to a problem associated with an unpleasant sound.

For example, U.S. Patent Application Publication No. 2016/0093441 and International Publication No. 2015/098990 disclose spacers covering portions of outer electrodes in a pair in a chip electronic component, such as a multilayer ceramic capacitor, in order to suppress the "acoustic noise" described above (the spacers are referred to as "metal frames" in U.S. Patent Application Publication No. 2016/0093441 and as "joint members" in International Publication No. 2015/098990). These spacers are disposed on at least a mounting board-facing surface of the component body of the chip electronic component. Therefore, the chip electronic component is mounted on the mounting board with the spacers interposed therebetween.

As described in U.S. Patent Application Publication No. 2016/0093441, the spacers are made of a conductive material, for example, such as a conductive metal, a conductive resin, or a circuit board coated with a metal or the like. The spacers are each defined by a pre-shaped block. As described in U.S. Patent Application Publication No. 2016/0093441, the blocks which will serve as spacers are disposed at predetermined positions on the chip electronic component in order to provide spacers.

However, it is not easy to attach, for example, the blocks to a compact chip electronic component having planar dimensions of 1.1 mm to 2.0 mm×0.6 mm to 0.9 mm such that the blocks are disposed in desired positions and a desired orientation. In an attempt to dispose the blocks at predetermined positions on the chip electronic component, the blocks may often shift to undesired positions or rotate in undesired directions on the chip electronic component.

In addition, the spacers when formed of a conductive resin may not withstand, for example, the soldering temperature.

In International Publication No. 2015/098990, a lead-free solder (Sn—Ag—Cu) is mentioned as an example of the material of the spacers of interest in the present invention. In forming spacers using a lead-free solder, the solder paste is applied to predetermined portions of the chip electronic component and subjected to a reflow treatment at the solder melting temperature, followed by cooling, as described in International Publication No. 2015/098990.

In the step of applying the solder paste in the method described in International Publication No. 2015/098990, it is relatively easy to apply the solder paste in a desired configuration to predetermined portions of the chip electronic component without shifts to undesired positions or rotation in undesired directions.

However, Experimental Examples described below indicate that, according to the inventors of preferred embodiments of the present invention, it has been impossible or very difficult to obtain spacers in an appropriate configuration in an attempt to provide spacers using a lead-free solder with a composition of Sn—Ag—Cu. This is because the metal components in the solder paste melt in the reflow process, which leads to a failure to maintain the configuration of the solder paste during application. More specifically, the solder may be spread out along the outer electrodes, and the thickness of the solder during application cannot be maintained. Alternatively, the solder may be dewetted on the outer electrodes and rise in a spherical shape, or the solder may move on the outer electrodes to cause a positional shift.

SUMMARY OF THE INVENTION

Preferred embodiments of the present invention provide chip electronic components in each of which it is easy to dispose spacers with sufficient heat resistance in a desired configuration.

A chip electronic component according to a preferred embodiment of the present invention includes a chip component body that includes a mounting surface facing a mounting board; at least two outer electrodes that are disposed on outer surfaces of the component body; and at least two spacers that are electrically connected to the respective outer electrodes and at least partially disposed along the mounting surface of the component body. The spacers each have a predetermined thickness direction dimension on the mounting surface as determined in a direction perpendicular or substantially perpendicular to the mounting surface. The spacers each contain, as a main component, an intermetallic compound containing at least one high-melting-point metal selected from Cu and Ni, and Sn defining and functioning as a low-melting-point metal.

The spacer containing, as a main component, an intermetallic compound having the above-described composition is obtained by applying, to the component body, a desired configuration of paste containing Sn and at least one selected from Cu and Ni and heating the paste. In this case, the configuration of the paste may be substantially maintained even after solidification.

In a chip electronic component according to a preferred embodiment of the present invention, the intermetallic compound is preferably an intermetallic compound provided by a reaction between Sn and a Cu-Ni alloy. Such an intermetallic compound has advantages of high reaction rate and small shape change when the intermetallic compound is provided.

A preferred embodiment of the present invention is advantageously applied to the following chip electronic component. Specifically, the component body has a rectangular or substantially rectangular parallelepiped shape including first and second main surfaces that oppose each other, first and second side surfaces that oppose each other, and first and second end surfaces that oppose each other. The first and second side surfaces and the first and second end surfaces connect the first and second main surfaces. The mounting surface is defined by the second main surface. The external electrodes are respectively provided on the first and second end surfaces and respectively extend from the end surfaces to portions of the first and second main surfaces and portions of the first and second side surfaces. Each spacer is disposed along the main surface defining and functioning as the mounting surface and includes a portion in contact with a corresponding one of the outer electrodes and a portion in contact with the main surface.

A chip electronic component according to a preferred embodiment of the present invention is preferably a multilayer ceramic capacitor having the above-described structure. When a preferred embodiment of the present invention is directed to such a multilayer ceramic capacitor, the spacers reduce an "acoustic noise", which is a problem that is often caused in the multilayer ceramic capacitor.

To effectively reduce an "acoustic noise" in the multilayer ceramic capacitor, the thickness direction dimension of each spacer is preferably about 10 µm or more.

In a preferred embodiment of the present invention, the spacers preferably contain a simple Sn metal in addition to the intermetallic compound. The Sn metal in the spacers provides good solderability of the spacers when the chip electronic component is mounted on the mounting board.

In a preferred embodiment of the present invention, the outermost layers of at least portions of the outer electrodes exposed from the spacers are preferably Sn-containing layers. With this structure, in the stage before the spacers are disposed, Sn-containing layers are also provided on regions of the outer electrodes to be in contact with the spacers. The Sn contributes to favorable formation of the intermetallic compound in the spacers.

Since, according to preferred embodiments of the present invention, the spacers each contain, as a main component, an intermetallic compound containing at least one high-melting-point metal selected from Cu and Ni and Sn defining and functioning as a low-melting-point metal, chip electronic components are provided that each include spacers that have a high melting point so as not to melt even at a soldering temperature and which are easy to dispose in a desired configuration.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4A is a front view, and FIG. 4B is a plan view.

DETAILED DESCRIPTION OF THE PREFERRED EMBODIMENTS

Preferred embodiments of the present invention will be described below with reference to the accompanying drawings.

Figure 1:
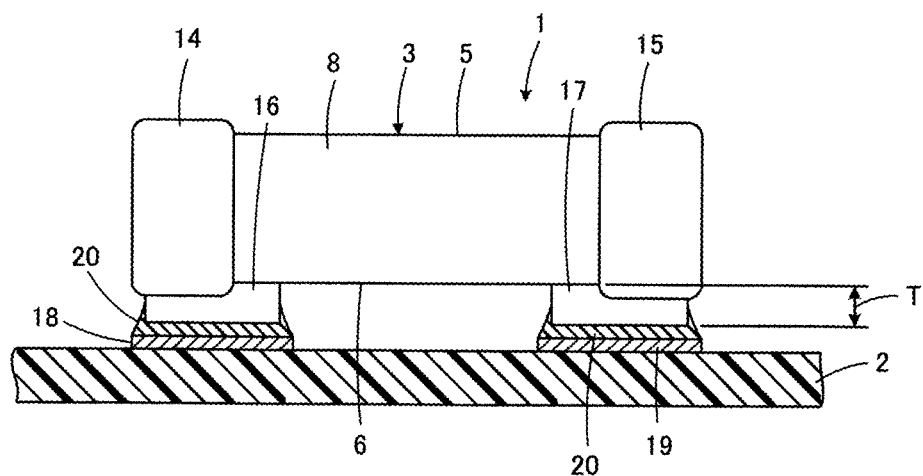
FIG. 1 is a front view of a chip electronic component 1 according to a first preferred embodiment of the present invention in a mounted state, where the components adjacent to a mounting board 2 are illustrated in cross-sectional view.
Figure 3:
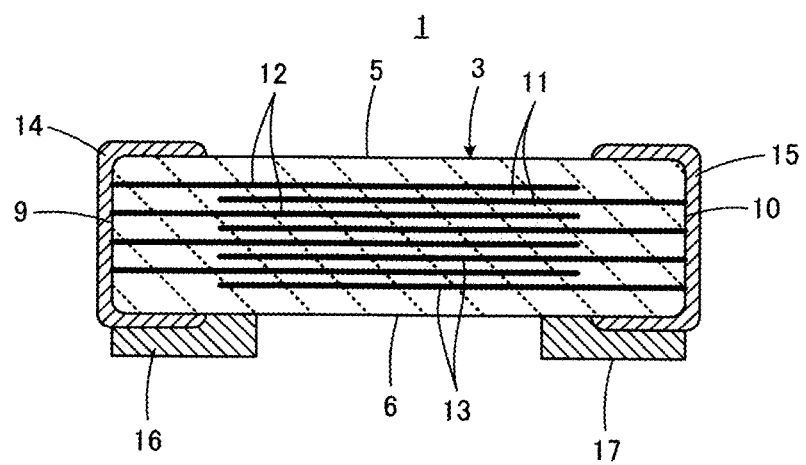
FIG. 3 is a cross-sectional view of the chip electronic component 1 taken along line III-III in FIG. 2.

Referring to FIG. 1 or FIG. 3, a chip electronic component 1 according to a first preferred embodiment of the present invention will be described. In the present preferred embodiment, the chip electronic component 1 is preferably a multilayer ceramic capacitor, for example.

The chip electronic component 1 includes a chip component body 3. The component body 3 preferably has, for example, a rectangular or substantially rectangular parallelepiped shape and includes first and second main surfaces 5 and 6, which oppose each other, first and second side surfaces 7 and 8, which oppose each other, and first and second end surfaces 9 and 10, which oppose each other. The first and second side surfaces 7 and 8 and the first and second end surfaces 9 and 10 connect the first and second main surfaces 5 and 6. In general, the edges and corners of the component body 3 having a rectangular or substantially rectangular parallelepiped shape are filleted.

As illustrated in FIG. 3, the component body 3 includes stacked ceramic layers 11 and inner electrodes 12 and 13 provided along the interfaces between the ceramic layers 11. The ceramic layers 11 are preferably made of, for example, a dielectric ceramic. The inner electrodes 12 and 13 preferably contain, for example, Ni as a conductive component.

The inner electrodes 12 and 13 are disposed such that the edges of the inner electrodes 12 and 13 are each exposed on the end surface 9 or 10 of the component body 3. The first inner electrodes 12 exposed on the first end surface 9 of the component body 3 and the second inner electrodes 13 exposed on the second end surface 10 alternate in the component body 3 so as to obtain electrostatic capacitance through the ceramic layers 11.

To obtain the electrostatic capacitance described above, a first outer electrode 14 electrically connected to the first inner electrode 12 and a second outer electrode 15 electrically connected to the second inner electrode 13 are respectively provided on the opposing first and second end surfaces 9 and 10 of the component body 3. The outer electrodes 14 and 15 are preferably formed by, for example, baking a conductive paste containing Cu as a conductive component. As needed, Ni plating and Sn plating are performed on the outer electrodes 14 and 15 in this order.

The first outer electrode 14 is not only provided on the first end surface 9 of the component body 3 but also extends to portions of the first and second main surfaces 5 and 6 and portions of the first and second side surfaces 7 and 8, which are adjacent to the end surface 9. The second outer electrode 15 is not only provided on the second end surface 10 of the component body 3 but also extends to portions of the first and second main surfaces 5 and 6 and portions of the first and second side surfaces 7 and 8, which are adjacent to the end surfaces 10.

In the chip electronic component 1, as illustrated in FIG. 1, the second main surface 6 defines and functions as a mounting surface facing the mounting board 2. In the following description, the reference numeral "6" is used for both the "second main surface" and the "mounting surface."

The first and second spacers 16 and 17 are disposed along the mounting surface 6. In the present preferred embodiment, the spacers 16 and 17 are disposed within the mounting surface 6, but the spacers 16 and 17 may extend to other surfaces of the component body 3.

The spacers 16 and 17 preferably each contain, for example, as a main component, an intermetallic compound containing at least one high-melting-point metal selected from Cu and Ni, and Sn defining a low-melting-point metal. In particular, the intermetallic compound is preferably, for example, an intermetallic compound provided by the reaction between Sn and a Cu-Ni alloy. Such an intermetallic compound has advantages of high reaction rate and small shape change when the intermetallic compound is provided. The spacers 16 and 17 may further contain Ag as a high-melting-point metal in the intermetallic compound.

Figure 2:
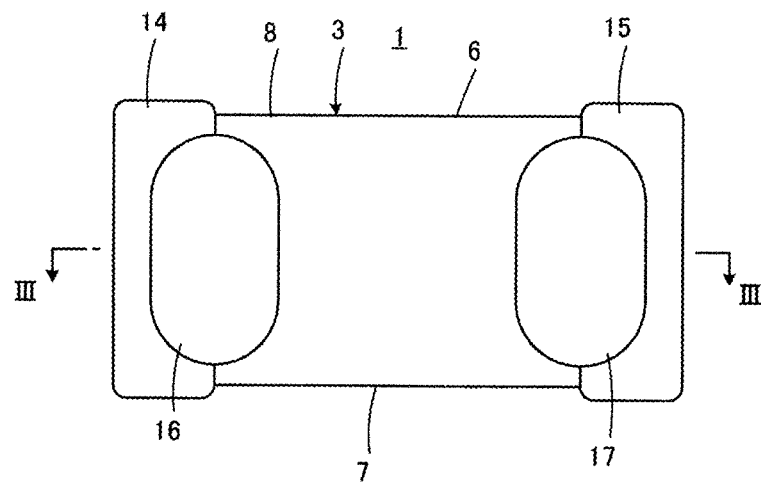
FIG. 2 is a bottom view of the chip electronic component 1 illustrated in FIG. 1.

As illustrate in FIG. 1, the spacers 16 and 17 each have a predetermined thickness direction dimension T on the mounting surface 6 as determined in the direction perpendicular or substantially perpendicular to the mounting surface 6. To provide the advantageous effect of reducing the "acoustic noise" described below, the thickness direction dimension T of each of the spacers 16 and 17 is preferably about 10 μm or more, for example. The first and second spacers 16 and 17 are electrically connected to the first and second outer electrodes 14 and 15, respectively. More specifically, as shown in FIG. 2, the first spacer 16 includes a portion in contact with the first outer electrode 14 and a portion in contact with the mounting surface 6, and the second spacer 17 includes a portion in contact with a second outer electrode 15 and a portion in contact with the mounting surface 6.

As illustrated in FIG. 1, the mounting board 2 includes first and second conductive lands 18 and 19, which correspond to the first and second outer electrodes 14 and 15. In mounting the chip electronic component 1 on the mounting board 2, the first and second spacers 16 and 17 are electrically connected and mechanically bonded to the first and second conductive lands 18 and 19, respectively, with solders 20 interposed therebetween. At this time, the solders 20 includes fillets along the side surfaces of the spacers 16 and 17.

The spacers 16 and 17 preferably contain, for example, a simple Sn metal, in addition to the intermetallic compound. The Sn metal in the spacers 16 and 17 provides good solderability when the chip electronic component 1 is mounted on the mounting board 2. To obtain the spacers 16 and 17 containing a simple Sn metal, for example, excess Sn is added to a metal material of the intermetallic compound. A portion of excess Sn is not used to provide the intermetallic compound and remains as a simple Sn metal in the spacers 16 and 17.

To provide good solderability, Sn plating may be performed over the spacers 16 and 17 and portions of the outer electrodes 14 and 15 exposed from the spacers 16 and 17 after the spacers 16 and 17 are provided.

When Ni plating and Sn plating are sequentially performed on the outer electrodes 14 and 15 as described above, the outermost layers of the outer electrodes 14 and 15 are Sn-containing layers at least in the stage before the spacers 16 and 17 are provided. In this case, a portion of the spacer 16 and a portion of the spacer 17 come into contact with the Sn-containing layers when the spacers 16 and 17 are provided. The Sn in the Sn-containing layers contributes to favorable formation of the intermetallic compound in the spacers 16 and 17. Therefore, the Sn in the outermost layers of the outer electrodes 14 and 15 remains in the regions exposed from the spacers 16 and 17 even after formation of the spacers 16 and 17. In the regions in contact with the spacers 16 and 17, the Sn may not remain after formation of the spacers 16 and 17.

In the mounted state of the chip electronic component 1, the solders 20 may extend to or may not extend to the outer electrodes 14 and 15 over the spacers 16 and 17, as illustrated in FIG. 1. However, to reduce the "acoustic noise" described below, the solders 20 preferably do not extend to the outer electrodes 14 and 15.

In order that the solders 20 do not extend to the outer electrodes 14 and 15 as described above, it is preferable that Sn-containing layers with high wettability to the solders 20 are not provided on the outermost layers of portions of the outer electrodes 14 and 15 exposed from the spacers 16 and 17. This indicates that the outer electrodes 14 and 15 may be subjected to only Ni plating without Sn plating or may be Cu-baked electrodes.

Next, a non-limiting example of a preferred method for forming the spacers 16 and 17 will be described.

(1) The component body 3 including the outer electrodes 14 and 15 is prepared.

(2) A metal material paste containing at least one high-melting-point metal selected from Cu and Ni, and Sn defining and functioning as a low-melting-point metal is prepared as a material of the spacers 16 and 17.

(3) A holder plate, such as alumina plate, for example, to which the metal material paste is not bonded under the reflow conditions is prepared.

(4) Metal material paste thick films are formed by applying the metal material paste in a desired pattern to the holder plate by, for example, a screen printing method or a dispensing method.

(5) The component body 3 prepared in (1) is mounted on the holder plate such that the mounting surface 6 opposes the holder plate. At this time, the outer electrodes 14 and 15 of the component body 3 are aligned with the metal material paste thick films made of the metal material paste, and the metal material paste thick films adhere to the component body 3 so as to cover a portion of the outer electrode 14 and a portion of the outer electrode 15.

(6) The reflow process is performed in the state of (5). In this process, the metals in the metal material paste form an intermetallic compound, and the metal material paste is solidified to form the spacers 16 and 17 bonded to the component body 3 and the outer electrodes 14 and 15.

(7) The component body 3 is isolated from the holder plate together with the spacers 16 and 17.

The chip electronic component 1 including the spacers 16 and 17 is obtained accordingly.

Figure 4A:
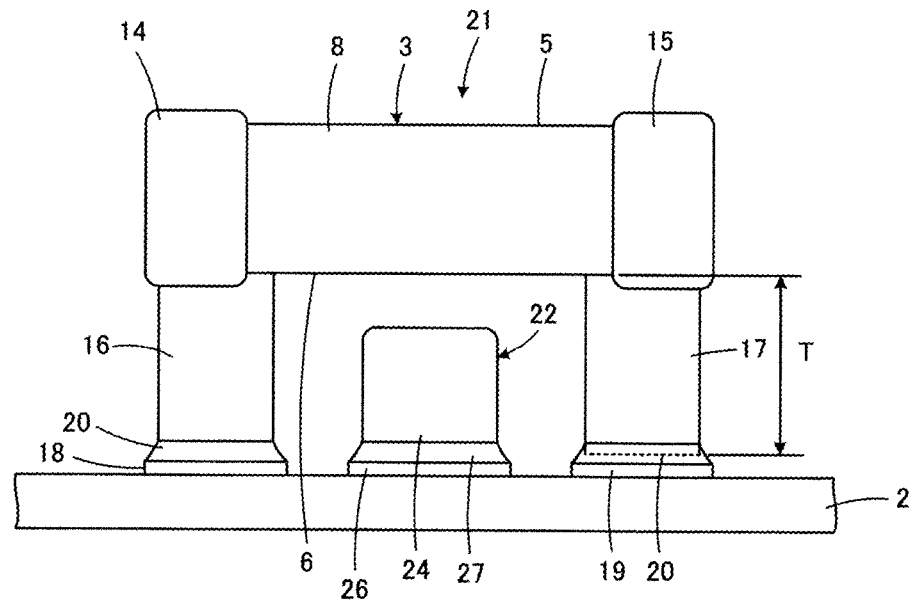
FIGS. 4A and 4B illustrate a chip electronic component according to a second preferred embodiment of the present invention in a mounted state, where
Figure 4B:
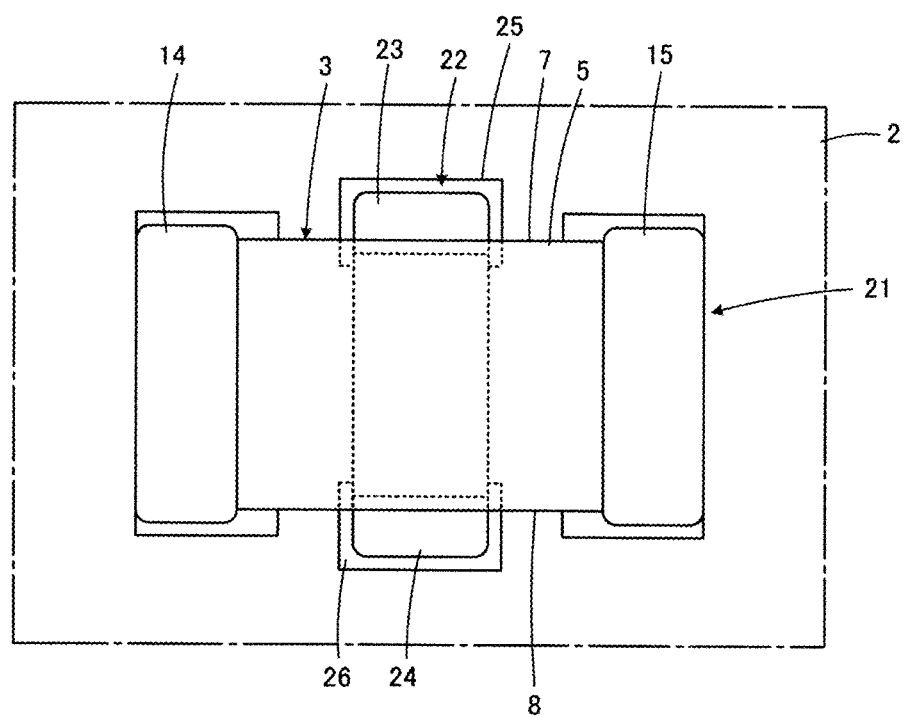

Next, referring to FIGS. 4A and 4B, a chip electronic component 21 according to a second preferred embodiment of the present invention will be described. In FIGS. 4A and 4B, the elements corresponding to the elements illustrated in FIG. 1 or FIG. 3 are provided with the same reference numerals, and the overlapping description is omitted.

In the chip electronic component 21, the thickness direction dimension T of the spacers 16 and 17 is larger than that in the chip electronic component 1. With this configuration, a different electronic component 22 is able to be mounted between the chip electronic component 21 and the mounting board 2. The different electronic component 22 is preferably, for example, a chip electronic component, and outer electrodes 23 and 24 of the electronic component 22 are electrically connected and mechanically bonded to conductive lands 25 and 26 on the mounting board 2 respectively with solders 27 interposed therebetween.

The three-dimensional mounting as described above is able to reduce the area used for mounting.

Next, an Experimental Example 1 provided to confirm the advantageous effects of reducing the "acoustic noise" generated by the chip electronic component 1, which defines a multilayer ceramic capacitor, according to the first preferred embodiment will be described.

Figure 5:
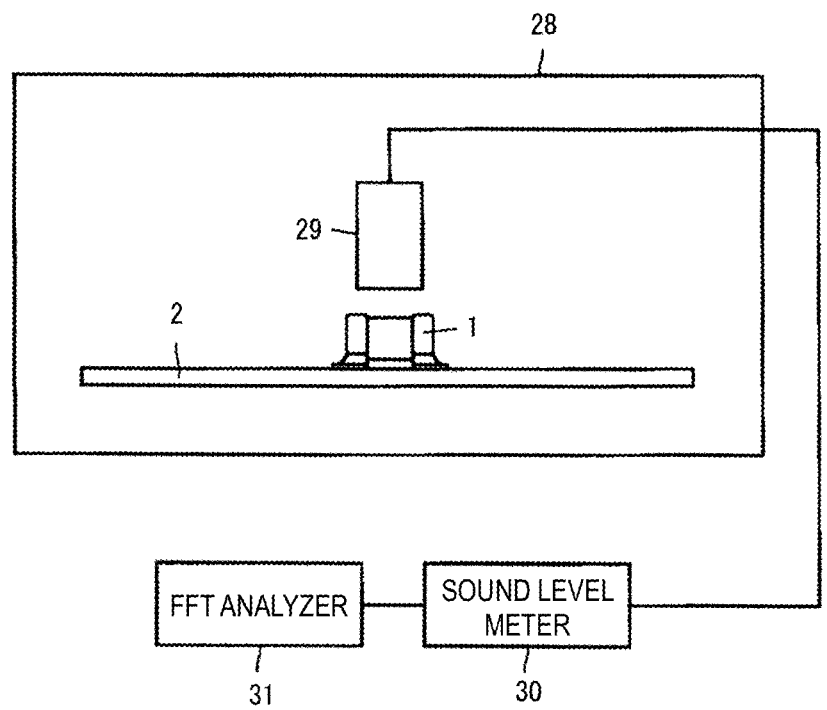
FIG. 5 is a schematic view of an apparatus used to measure the sound pressure level of an unpleasant sound generated for an "acoustic noise" of the chip electronic component 1 that defines a multilayer ceramic capacitor.

FIG. 5 illustrates an apparatus used to measure the sound pressure level of an unpleasant sound generated for the "acoustic noise" of the chip electronic component 1, which defines a multilayer ceramic capacitor.

Referring to FIG. 5, a mounting board 2 on which the chip electronic component 1 is mounted is disposed in an anechoic box 28. A sound-collecting microphone 29 is disposed so as to oppose the mounting board 2. For example, an alternating voltage having a frequency of about 3 kHz and a voltage of about 1 Vpp is then applied to the chip electronic component 1, which defines a multilayer ceramic capacitor. The application of the alternating voltage causes the chip electronic component 1 to deform the mounting board 2 at the above-described frequency, generating an unpleasant sound called an "acoustic noise". This unpleasant sound is collected by the sound-collecting microphone 29, and the output of the sound-collecting microphone 29 is inputted into an FFT (Fast Fourier Transform) analyzer 31 through a sound level meter 30, where the sound pressure level is analyzed.

Figure 6:
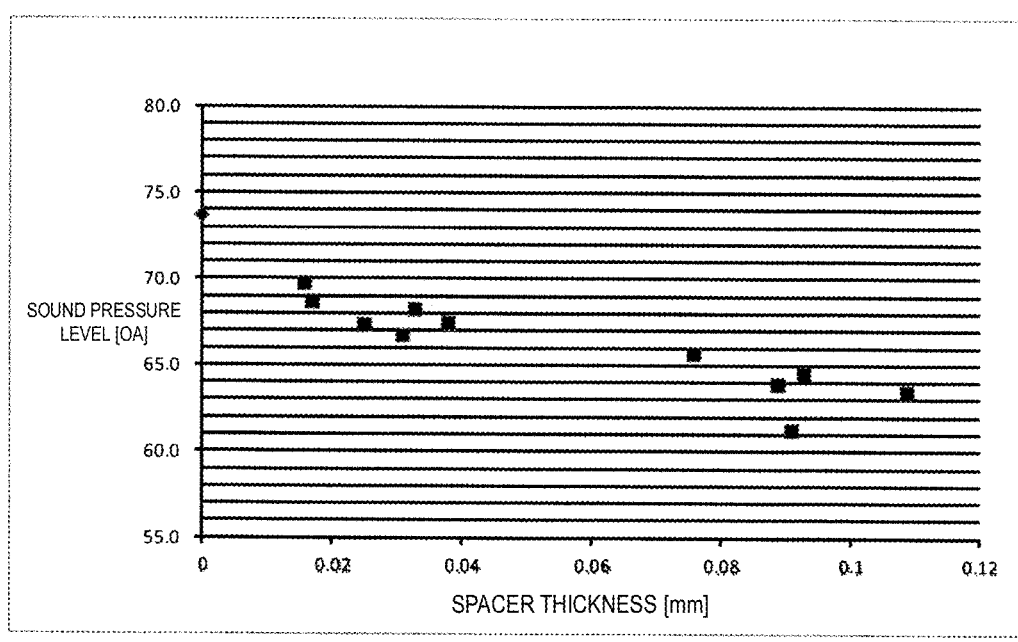
FIG. 6 is a graph showing the relationship between the sound pressure level measured by using the apparatus illustrated in FIG. 5 and the spacer thickness in Experimental Example 1.

The sound pressure level of the unpleasant sound obtained as described above is shown in Table 1 and FIG. 6. The data shown in Table 1 and FIG. 6 are associated with a multilayer ceramic capacitor including a component body with a longitudinal direction dimension of about 1.12 mm, a width direction dimension of about 0.63 mm, and a height direction dimension of about 0.63 mm, for example. The metal material paste used for the spacers was a metal material paste containing about 31.5 wt % of a Cu-10 wt % Ni powder with a D50 of about 5 μm, about 58.5 wt % of a solder powder with a D50 of about 5 μm and a composition of Sn-3 wt % Ag-0.5 wt % Cu, and about 10 wt % of a flux. The sound pressure level of the unpleasant sound was measured as a function of the thickness direction dimension of the spacer.

TABLE 1

| Sample No. | Spacer Thickness [mm] | Sound Pressure Level [OA] |
|---|---|---|
| 1 | 0 | 73.7 |
| 2 | 0.016 | 69.6 |
| 3 | 0.017 | 68.6 |
| 4 | 0.025 | 67.3 |
| 5 | 0.031 | 66.7 |
| 6 | 0.033 | 68.2 |
| 7 | 0.038 | 67.4 |
| 8 | 0.076 | 65.6 |
| 9 | 0.089 | 63.9 |
| 10 | 0.091 | 61.2 |
| 11 | 0.093 | 64.4 |
| 12 | 0.109 | 63.4 |

Table 1 and FIG. 6 indicate that the sound pressure level of the unpleasant sound of Samples 2 to 12 having spacers with a thickness of about 10 μm (about 0.01 mm) or more is lower than that of Sample 1 including no spacer, that is, including spacers with a thickness of about 0 mm. According to the comparison among Samples 2 to 12, the sound pressure level generally tends to decrease as the thickness of the spacers increases.

In an Experimental Example 2, the configuration retainability after reflow was compared between an Example according to a preferred embodiment of the present invention and a Comparative Example. In the Example, a metal material containing, as a main component, an intermetallic compound containing at least one high-melting-point metal selected from Cu and Ni, and Sn defining and functioning as a low-melting-point metal was used as a metal material for the spacers. In the Comparative Example, the lead-free solder with a composition of Sn—Ag—Cu described in International Publication No. 2015/098990 was used as a metal material for the spacers.

In the Example, the metal material paste containing about 31.5 wt % of a Cu—about 10 wt % Ni powder with a D50 of about 5 μm, about 58.5 wt % of a solder powder with a D50 of about 5 μm, and a composition of Sn-3 wt % Ag-0.5 wt % Cu, and about 10 wt % of a flux was used as in the Experimental Example 1.

In the Comparative Example, a lead-free solder paste "M705-GRN360-K2-V" with a composition of Sn-Ag-Cu available from Senju Metal Industry Co., Ltd. was used as a metal material paste.

Figure 7:
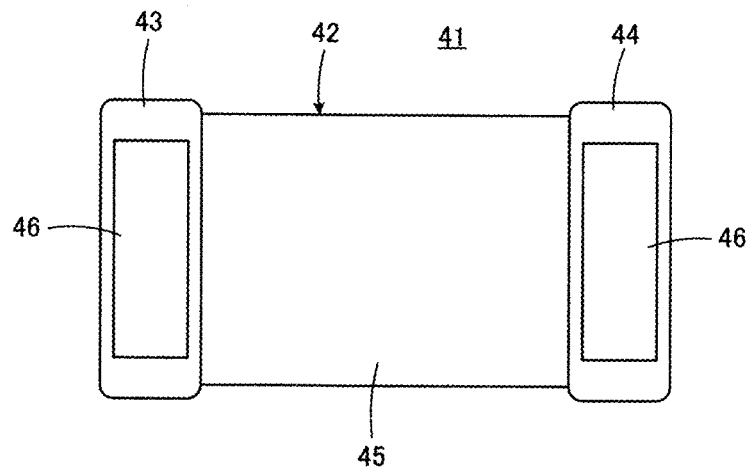
FIG. 7 is a bottom view illustrating the appearance of a chip electronic component 41 according to each of an Example of a preferred embodiment of the present invention and a Comparative Example produced in an Experimental Example 2, where metal material paste thick films 46 which will define and function as spacers are provided on outer electrodes 43 and 44 of the chip electronic component 41.

The chip electronic component 41 as illustrated in FIG. 7 was prepared as a sample. The chip electronic component 41 includes a component body 42 having a rectangular or substantially rectangular parallelepiped shape. The component body 42 includes, at both end portions, the outer electrodes 43 and 44, which include a baked layer formed by baking a conductive paste containing Cu as a conductive component. Here, three types of chip electronic components including the outer electrodes 43 and 44 were prepared: a chip electronic component 41A, which includes outer electrodes each including the baked layer, a Ni-plating layer on the baked layer, and a Sn-plating layer on the Ni-plating layer; a chip electronic component 41B, which includes outer electrodes each including only the baked layer; and a chip electronic component 41C, which includes outer electrodes each including only the baked layer but with the surface subjected to barrel finishing to remove an oxide film on the surface.

Next, the metal material paste was applied to portions of the outer electrodes 43 and 44 adjacent to a mounting surface 45 of the component body 42 to form metal material paste thick films 46, which would define and function as spacers having a rectangular pattern as illustrated in FIG. 7. More specifically, the following Samples 1 to 6 were produced.

Sample 1: The metal material paste thick films 46 were formed on the chip electronic component 41A using the metal material paste according to the Example as a metal material paste.

Sample 2: The metal material paste thick films 46 were formed on the chip electronic component 41B using the metal material paste according to the Example as a metal material paste.

Sample 3: The metal material paste thick films 46 were formed on the chip electronic component 41C using the metal material paste according to the Example as a metal material paste.

Sample 4: The metal material paste thick films 46 were formed on the chip electronic component 41A using the metal material paste according to the Comparative Example as a metal material paste.

Sample 5: The metal material paste thick films 46 were formed on the chip electronic component 41B using the metal material paste according to the Comparative Example as a metal material paste.

Sample 6: The metal material paste thick films 46 were formed on the chip electronic component 41C using the metal material paste according to the Comparative Example as a metal material paste.

Next, the metal material paste thick films 46 of Samples 1 to 6 were subjected to a reflow treatment. The configuration of the metal material thick films which would define and function as spacers obtained after the reflow treatment of the metal material paste thick films 46 was then evaluated.

Figure 8:
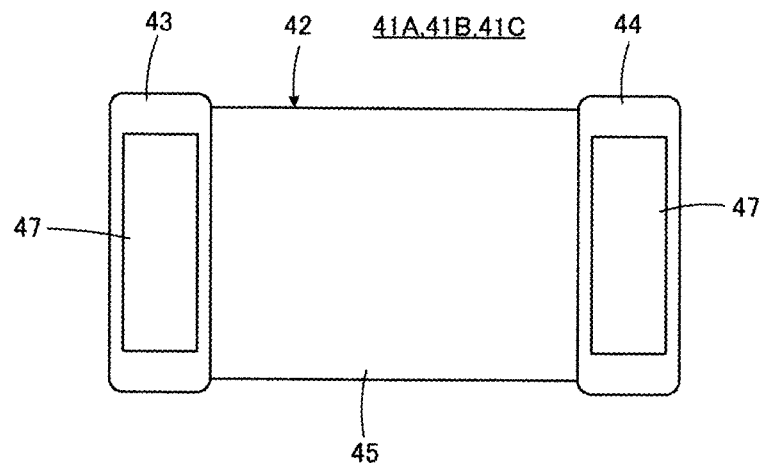
FIG. 8 is a view illustrating the state of metal material thick films 47 after the reflow treatment in the case in which the metal material paste thick films 46 illustrated in FIG. 7 each have the composition according to the Example.

In any of Samples 1 to 3 according to the Example, as illustrated in FIG. 8, metal material thick films 47 obtained after the reflow treatment substantially retained the configuration of the metal material paste thick films 46 (see FIG. 7) obtained before the reflow treatment.

Figure 9:
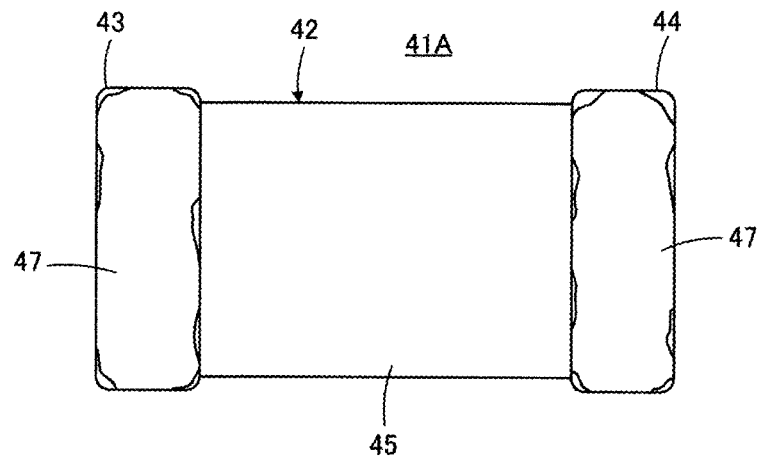
FIG. 9 is a view illustrating the state of metal material thick films 47 after the reflow treatment in the case in which the metal material paste thick films 46 illustrated in FIG. 7 each have the composition according to the Comparative Example and the outer electrodes 43 and 44 each include a conductive paste-baked layer containing Cu as a conductive component, a Ni-plating layer on the baked layer, and a Sn-plating layer on the Ni-plating layer.

In Sample 4 according to the Comparative Example, as illustrated in FIG. 9, the metal material thick films 47 obtained after the reflow treatment was spread out on the outer electrodes 43 and 44 and failed to retain the planar shape and thickness of the metal material paste thick films 46 obtained before the reflow treatment. This may be because the Sn plating films on the surfaces of the outer electrodes 43 and 44 improved the wettability of the metal material.

Figure 10:
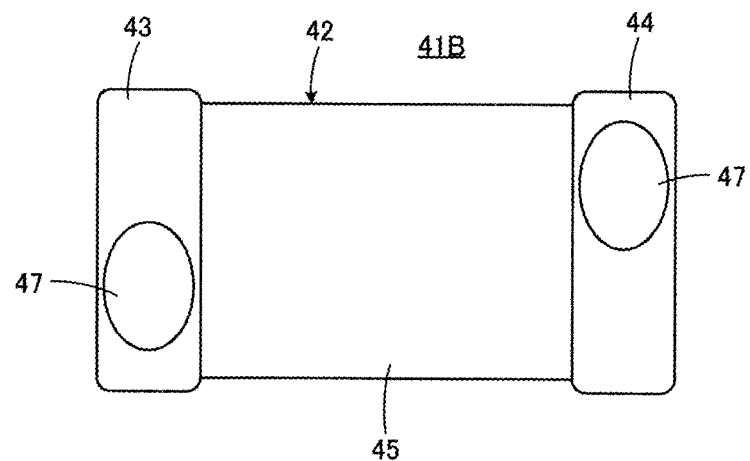
FIG. 10 is a view illustrating the state of metal material thick films 47 after the reflow treatment in the case in which the metal material paste thick films 46 illustrated in FIG. 7 each have the composition according to the Comparative Example and the outer electrodes 43 and 44 each include only a conductive paste-baked layer containing Cu as a conductive component.

Next, in Sample 5 according to the Comparative Example, as illustrated in FIG. 10, the spread of the metal material was not observed on the surfaces of the outer electrodes 43 and 44, the metal material was dewetted on the surfaces of the outer electrodes 43 and 44, and the metal material thick films 47 obtained after the reflow treatment rose in a substantially spherical shape. It was also difficult to symmetrically form the metal material thick films 47 on the outer electrodes 43 and 44.

Figure 11:
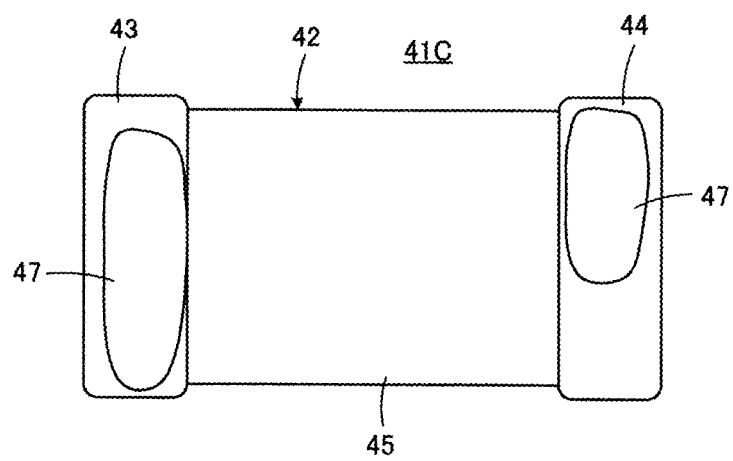
FIG. 11 is a view illustrating the state of metal material thick films 47 after the reflow treatment in the case in which the metal material paste thick films 46 illustrated in FIG. 7 each have the composition according to the Comparative Example and the outer electrodes 43 and 44 each include only a conductive paste-baked layer containing Cu as a conductive component but have further been subjected to barrel finishing.

Next, in Sample 6 according to the Comparative Example, as illustrated in FIG. 11, the spread of the metal material was not observed on the surfaces of the outer electrodes 43 and 44, and the metal material was dewetted on the surfaces of the outer electrodes 43 and 44. The metal material thick films 47 obtained after the reflow treatment rose lower than those in Sample 5, but it was difficult to symmetrically form the metal material thick films 47 on the outer electrodes 43 and 44.

When the metal material thick films 47 according to the Example and the metal material thick films 47 according to the Comparative Example were heated again, the metal material thick films 47 according to the Example were confirmed to maintain their configurations in any of Samples 1 to 3. In Sample 4, the metal material thick films 47 according to the Comparative Example became molten again other than small portions of the metal material thick films 47 in contact with the Sn plating films on the surfaces of the outer electrodes 43 and 44. In Samples 5 and 6, the metal material thick films 47 according to the Comparative Example entirely became molten again.

Additionally, as illustrated in FIG. 1 to FIG. 3, an attempt was also made to configure the first and second spacers 16 and 17 to include portions in contact with the first and second outer electrodes 14 and 15 and portions in contact with the mounting surface 6 in an experiment. In this experiment, an attempt was made to form the spacers 16 and 17 made of the metal material thick films by forming the metal material paste thick films so as to have the patterns of the spacers 16 and 17 and next performing the reflow treatment.

In the case of using the metal material paste according to the Example, the spacers 16 and 17 made of the metal material thick films in an appropriate configuration were formed regardless of the presence or absence of the Sn plating films on the surfaces of the outer electrodes 14 and 15.

In the case of using the metal material paste according to the Comparative Example, the spacers 16 and 17 in an appropriate configuration were not formed. In particular, when the Sn plating films were present on the surfaces of the outer electrodes 14 and 15, a large portion of the metal material located on the mounting surface 6 was attracted to the outer electrodes 14 and 15 as a result of the reflow process, which resulted in a failure to form the spacers so as to include portions in contact with the first and second outer electrodes 14 and 15 and portions in contact with the mounting surface 6.

In the foregoing description, a chip electronic component that defines a multilayer ceramic capacitor is described as the chip electronic component according to preferred embodiments of the present invention. Preferred embodiments of the present invention may also be applied to chip electronic components having electrostriction, such as chip coil components and chip piezoelectric components, for example, other than multilayer ceramic capacitors.

Since the spacers which are characteristic structures of preferred embodiments of the present invention not only reduce the "acoustic noise" but also to enable three-dimensional mounting, chip electronic components according to preferred embodiments of the present invention are not limited to those having electrostriction.

It should be understood that the preferred embodiments described above are illustrative only, and partial replacements or combinations of configurations may be made between different preferred embodiments.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A chip electronic component comprising:
   a chip component body including a mounting surface facing a mounting board;
   at least two outer electrodes disposed on outer surfaces of the component body; and
   at least two spacers respectively electrically connected to the at least two outer electrodes and at least partially disposed along the mounting surface of the component body;
   wherein
      each of the at least two spacers have a predetermined thickness direction dimension on the mounting surface in a direction perpendicular or substantially perpendicular to the mounting surface;
      each of the at least two spacers contains an intermetallic compound containing at least one metal selected from Cu and Ni, and a simple Sn metal;
      the chip component body has a rectangular or substantially rectangular parallelepiped shape including first and second main surfaces that oppose each other, first and second side surfaces that oppose each other, and first and second end surfaces that oppose each other, the first and second side surfaces and the first and second end surfaces connecting the first and second main surfaces, and the mounting surface is defined by the second main surface;
      the at least two outer electrodes are respectively provided on the first and second end surfaces and respectively extend from the first and second end surfaces to portions of the first and second main surfaces and portions of the first and second side surfaces;
      each of the at least two spacers is disposed on the second main surface and includes a portion in contact with a corresponding one of the at least two outer electrodes and a portion in contact with the second main surface; and
      the at least two spacers are bonded to the mounting board by a bonding material.

2. The chip electronic component according to claim 1, wherein the intermetallic compound is an intermetallic compound provided by a reaction between the Sn and a Cu—Ni alloy.

3. The chip electronic component according to claim 1, wherein the chip electronic component is a multilayer ceramic capacitor.

4. The chip electronic component according to claim 3, wherein the thickness direction dimension of each of the at least two spacers is about 10 μm or more.

5. The chip electronic component according to claim 1, wherein each of the at least two spacers contains a simple Sn metal, in addition to the intermetallic compound.

6. The chip electronic component according to claim 1, wherein outermost layers of at least portions of the at least two outer electrodes exposed from the at least two spacers are Sn-containing layers.

7. The chip electronic component according to claim 1, wherein edges and corners of the component body are filleted.

8. The chip electronic component according to claim 1, wherein the component body includes stacked ceramic layers and inner electrodes provided along interfaces between the ceramic layers.

9. The chip electronic component according to claim 8, wherein the inner electrodes contain Ni as a conductive component.

10. The chip electronic component according to claim 8, wherein each of the inner electrodes is connected to one of the at least two outer electrodes.

11. The chip electronic component according to claim 1, wherein each of the at least two spacers further contains Ag.

12. The chip electronic component according to claim 1, wherein an outermost layer of each of the at least two outer electrodes is an Sn plating layer.

13. The chip electronic component according to claim 1, wherein the component body has a longitudinal direction dimension of about 1.12 mm, a width direction dimension of about 0.63 mm, and a height direction dimension of about 0.63 mm.

14. A chip electronic component comprising:
   a chip component body including a mounting surface facing a mounting board;
   at least two outer electrodes disposed on outer surfaces of the component body; and
   at least two spacers respectively electrically connected to the at least two outer electrodes and at least partially disposed along the mounting surface of the component body;
   wherein
      each of the at least two spacers have a predetermined thickness direction dimension on the mounting surface in a direction perpendicular or substantially perpendicular to the mounting surface;
      each of the at least two spacers contains at least one metal selected from Cu and Ni, and a simple Sn metal;
      the chip component body has a rectangular or substantially rectangular parallelepiped shape including first and second main surfaces that oppose each other, first and second side surfaces that oppose each other, and first and second end surfaces that oppose each other, the first and second side surfaces and the first and second end surfaces connecting the first and second main surfaces, and the mounting surface is defined by the second main surface;
      the at least two outer electrodes are respectively provided on the first and second end surfaces and respectively extend from the first and second end surfaces to portions of the first and second main surfaces and portions of the first and second side surfaces;
      each of the at least two spacers is disposed on the second main surface and includes a portion in contact with a corresponding one of the at least two outer electrodes and a portion in contact with the second main surface; and the at least two spacers are bonded to the mounting board by a bonding material.

\* \* \* \* \*